United States Patent [19]
Alinari

[11] 3,837,225
[45] Sept. 24, 1974

[54] DEPTH GAUGES
[76] Inventor: Carlo Alinari, Corso Vittorio Emanuele 200, Turin, Italy
[22] Filed: May 17, 1972
[21] Appl. No.: 254,270

Related U.S. Application Data
[63] Continuation of Ser. No. 120,225, March 2, 1971, abandoned.

[30] Foreign Application Priority Data
Mar. 14, 1970 Italy ................................. 67877/70

[52] U.S. Cl. ...................... 73/300, 73/406, 73/411, 116/70, 116/129
[51] Int. Cl. ............................................. G01f 23/14
[58] Field of Search ............ 73/299, 300, 406, 419, 73/418, 411; 92/103 R, 103 S, 5 R; 116/129, 70

[56] References Cited
UNITED STATES PATENTS
3,693,446  9/1972  MacNiel ............................. 73/300

*Primary Examiner*—Donald O. Woodiel
*Attorney, Agent, or Firm*—Sughrue, Rothwell, Mion, Zinn & Macpeak

[57] ABSTRACT
A depth gauge has a rigid casing and a transparent face, at least a portion of the transparent face being flexible to allow external pressure to be transmitted to the interior of the instrument.

14 Claims, 3 Drawing Figures

DEPTH GAUGES

This is a Continuation of application Ser. No. 120,225, filed Mar. 2, 1971, now abandoned.

This invention relates to depth gauges comprising a hermetically sealed cup-shaped casing containing an inert liquid such as oil, and a sealed bourdon tube that is deformable under changes in the pressure in the oil. A mechanism is provided to magnify movements of the Bourdon tube and register them on a graduated dial. The dial is usually graduated to give a direct reading of the depth at which the gauge is immersed, corresponding to the pressure at that depth. The dial is covered by a rigid transparent face that is sealed at the mouth of the casing.

Because the gauge must measure the pressure of the surrounding atmosphere, the casing, which is otherwise rigid, has in the past been perforated and provided with a flexible membrance covering the perforation. The membrane transmits the external pressure to the oil. An example of such depth gauges is disclosed in U.S. Pat. No. 2,935,873, inventor T. Stewart. The necessity to provide a sound seal between the edges of the membrane and the rigid casing complicates this construction and renders it comparatively expensive.

Another solution is disclosed in U.S. Pat. No. 3,203,244, inventor C. Alinari. In this case the casing is made of a material such as some plastic materials which has a degree of flexibility, and includes a thin wall which is sufficiently flexible to act as a pressure-transmitting membrane. The one-piece construction of the casing simplifies manufacture of the gauge, but the membrane wall, being of necessity somewhat delicate and being exposed to the surrounding atmosphere, is liable to be easily damaged.

An object of the invention is to provide a depth gauge in which these problems are eliminated, allowing the use of a rigid and sturdy casing that is free of membrane-covered perforations or weakened walls.

The invention provides, in a depth gauge comprising a rigid cup-shaped casing containing a Bourdon tube, a dial and an indicator to register movements of the bourdon tube on the dial, the casing being filled with an inert liquid, and a transparent face covering the dial and sealed to the casing, the improvement that the transparent face includes a flexible zone adapted to deflect under external pressure and to transmit such pressure to the inert liquid.

It is necessary to provide sould sealing for the face to the casing, and a further object of the invention is to provide such sealing.

Figure 1:
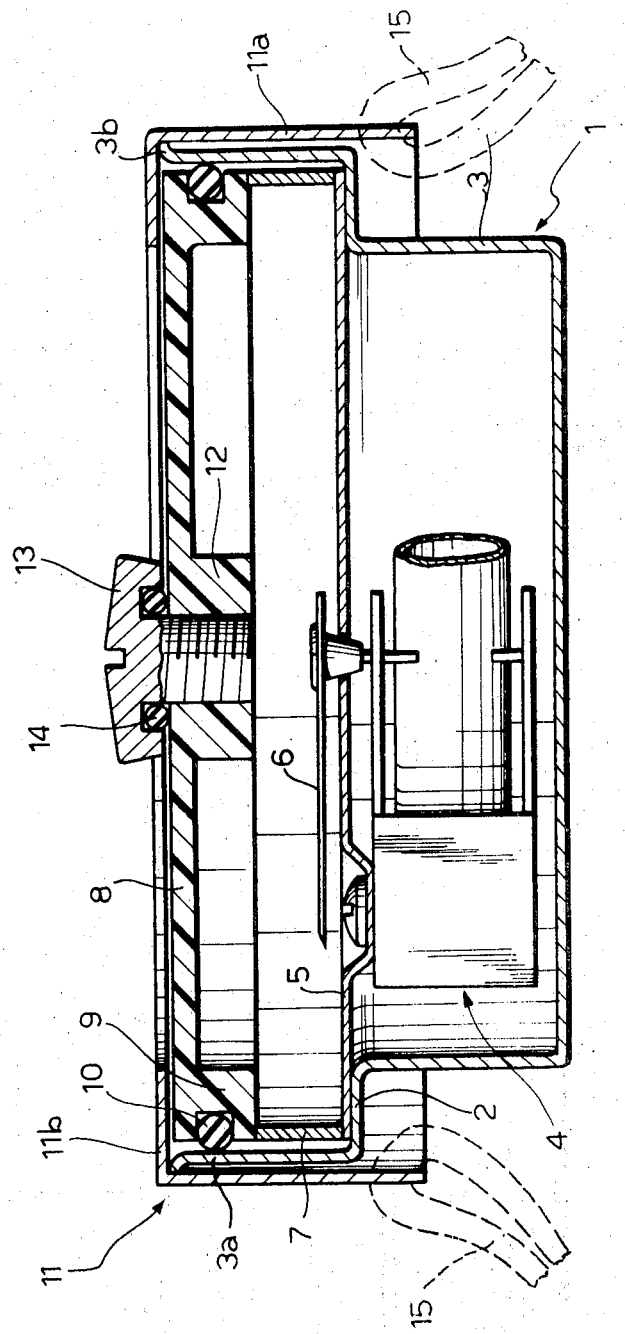
FIG. 1 is a fragmentary axial sectioned view through a depth gauge according to the invention.
Figure 2:
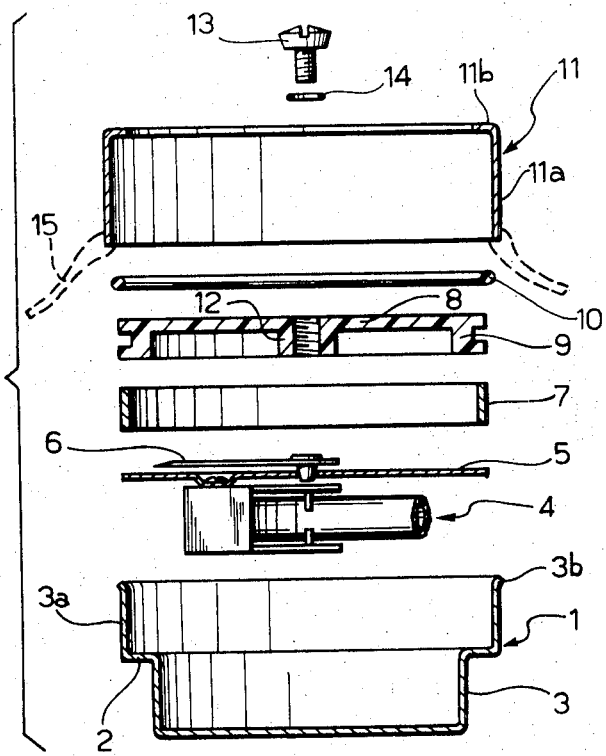
FIG. 2 is an exploded axial sectioned view on a reduced scale of the casing and main interior components of the gauge of FIG. 1.

In FIGS. 1 and 2, the depth gauge has a rigid sheet metal cup-shaped casing 1 comprising a lower part 3 and an upper part 3a of greater diameter joined by a radial flange 2 that forms a rebate. The casing has an outwardly flared mouth 3b.

The part 3 of the casing 1 contains a Bourdon tube 4 of known type, being a curved tube of oval cross-section that is sealed and is fixed at one end. Pressure differences in the casing cause the tube 4 to flex. A mechanism (not illustrated) attached to its free end causes such movements to be magnified and registered on a dial 5 by means of a needle indicator 6 rotatable about the axis of the casing 1. The dial 5 is graduated in units of depth.

The tube 4 and the other mechanism of the gauge are supported by the dial 5, which forms a transverse diaphragm whose edge rests on the shoulder 2. It is held in place by a spacer ring 7 on which bears a transparent face 8 of the gauge which extends into the upper part 3a of the casing and is sealed in it by an O-ring 10 seated in a peripheral groove in an enlarged edge portion of the face 8. A metal ring 11 having a skirt portion 11a and a radial flange portion 11b covers the edge zone of the face 8, the mouth 3b of the casing 1 seating as a force-fit in the ring 11 at the junction of its parts 11a and 11b. The part 11b exerts pressure on the face 8 to hold it firmly in place. This also secures the spacer ring 7 and dial 5 in place so that the gauge is properly assembled.

In addition to its enlarged edge 9, the face 8 has a central boss 12 which is bored and threaded and in which is screwed a plug in the form of a stud 13 having an annular groove on its undersurface to accommodate an O-ring 14. The stud 13 can be removed to allow the cavity of the casing 1 to be filled with an inert incompressible liquid such as mineral oil through which pressure is transmitted to the bourdon tube 4. Replacement of the stud 13 and ring 14 seals the casing.

Between the boss 12 and the enlarged edge zone 9, the face 8, which is made of a suitably hard but flexible material such as an acrylic resin, has a relatively thin zone which is capable of flexing sufficiently under external pressure to transmit such pressure to the oil in the casing 1. It has been found that such a material allows accurate pressure transmission by virtue of its inherent flexibility and also by virtue of the fact that only slight deflection is required to transmit pressure changes since the oil in the casing 1 is in any case incompressible.

The change in pressure is of course transmitted in the usual way to the tube 4 and is registered on the dial 5 by movement of the needle 6.

The gauge is provided with a strap 15, shown only schematically, for application to a wearer's wrist.

Figure 3:
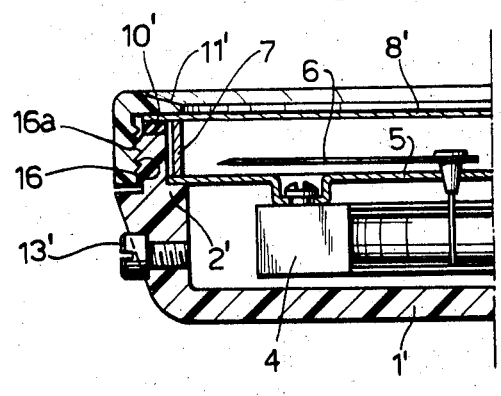
FIG. 3 is a view similar to FIG. 1 of a modified embodiment.

The embodiment of FIG. 3, in which components corresponding to those of FIGS. 1 and 2 are indicated by like reference numerals, has a cup-shaped casing 1' of plastic material, formed with an annular rebate 2' below its mouth. A dial 5 to which is attached a Bourdon tube 4 and its associated mechanism seats on the rebate 2', and is held in place by a spacer ring 7 which is in turn acted upon by a transparent face 8'. The face 8' is a disc of uniform thickness, bearing on the mouth of the casing 1' through an annular sealing ring 10', and being sufficiently thin to flex satisfactorily and allow the pressure of the surrounding atmosphere to be transmitted to oil in the cavity of the casing 1'.

The disc 8' is held in place under pressure by a plastic retaining ring 11' which has a skirt portion 11b' with internal threading 16a which screws on to complemental threading 16 on the casing 1'.

For filling with oil, the casing 1' has a threaded cavity closed by a stud 13'.

It is clear that the gauge of the invention is simpler and cheaper to construct that those known previously.

What I claim is:

1. In a depth gauge comprising a rigid cup-shaped casing containing a Bourdon tube, a dial and an indicator to register movements of the Bourdon tube on the dial, the casing being filled with an inert liquid, and a transparent face covering the dial and sealed to the casing, the improvement that the transparent face includes at least a portion of which is movable under external pressure to transmit such pressure to the inert liquid.

2. The gauge of claim 1, in which the face has an enlarged edge provided with a groove accommodating a sealing ring which bears against a surface of the casing, and a central boss bored to accommodate a plug member that is removable to allow filling of the casing with the liquid, the zone of the face between the enlarged edge and the central boss being flexible.

3. The gauge of claim 1, in which the whole transparent face is flexible.

4. The gauge of claim 3, in which the face covers the mouth of the casing and bears on it through a sealing ring, the face being pressed in place by a retaining ring screwed on to a threaded portion of the casing.

5. The gauge of claim 3, including a removable plug member located in a hole in the casing to allow filling of the casing with the liquid.

6. A pressure responsive instrument, comprising:
a rigid housing defining a chamber, said housing having an opening therein communicating with said chamber,
a transparent pressure responsive closure member mounted in said opening for limited movement toward and away from said chamber,
a liquid in said chamber and substantially filling the same,
means for sealing said closure member in said opening throughout its limited range of movement, to seal said liquid within said chamber, and
means disposed in said chamber for indicating pressure of said liquid,
whereby pressure exerted upon said closure member is transmitted to said liquid and visibly indicated by said indicating means through said transparent pressure responsive closure member.

7. A depth gauge, comprising:
a housing defining a chamber,
said housing having an opening therein communicating with said chamber,
a closure member resiliently mounted in said opening in sealing relation to said housing for limited motion toward and away from said chamber in response to pressure exerted upon said closure member,
said closure member being transparent,
a liquid sealed within said chamber, and
indicating means disposed within said chamber for indicating the pressure of said liquid,
said indicating means being visible through said closure member.

8. The gauge of claim 7 wherein said indicating means comprises
a Bourdon tube mounted in said chamber,
a dial disposed between said Bourdon tube and said closure member and having a diameter substantially equal to the diameter of said chamber, and
a pointer operatively connected with the Bourdon tube for movement over said dial.

9. The gauge of claim 7 wherein said chamber is generally cylindrical and has an axial length less than its diameter, wherein a fixed end member is sealed to said housing at one end of said chamber, and wherein said opening is substantially co-extensive with the other end of said chamber.

10. A pressure responsive instrument comprising:
a rigid housing defining a chamber,
said housing having an opening therein communicating with said chamber,
a pressure responsive closure member formed of a transparent plate substantially completely filling said opening, said transparent plate being mounted in said opening for limited movement toward and away from said chamber,
a liquid in said chamber and substantially filling the same,
means for sealing said transparent plate in said opening to seal said liquid within said chamber, said sealing means comprising:
a flexible element interposed in sealing relationship between the periphery of said plate and the portion of said housing encompassing said opening, and
means disposed in said chamber for indicating pressure of said liquid,
whereby pressure exerted upon said transparent plate is transmitted thereby to said liquid and visibly indicated by said indicating means through said transparent plate.

11. A depth gauge, comprising:
a housing defining a chamber,
said housing having an opening therein communicating with and substantially coextensive with one end of said chamber,
said housing being generally cylindrical and having an axial length less than its diameter,
a fixed end member sealed to said housing at the other end of said chamber,
a transparent pressure responsive closure member resiliently mounted in said opening in sealing relation to said housing for a limited motion toward and away from said chamber in response to pressure exerted upon said closure member,
a liquid sealed within and filling said chamber and in full contact with said rigid transparent closure member, and
indicating means disposed within said chamber and visible through said transparent pressure responsive closure member for indicating pressure of said liquid.

12. An underwater depth gauge comprising:
a rigid housing defining a chamber,
said housing having an opening therein communicating with said chamber,
a transparent pressure responsive closure member mounted in said opening for limited movement toward and away from said chamber,
a liquid in said chamber,
means for securing and sealing said closure member to and within said opening to seal said liquid within said chamber, to retain said closure member in a predetermined position when it is subjected to substantially atmospheric pressure, and to permit limited movement thereof when it is subjected to the greater pressure of a body of water in which the gauge is submerged, said securing and sealing means comprising means circumscribing the periphery of said closure member and secured throughout its extent in sealing relation both to said closure member and to the opening of said chamber, and means within said chamber and visible through said transparent closure member for indicating pressure of said liquid, whereby pressure exerted upon said closure member is transmitted to said liquid and visibly displayed by said indicating means through said transparent pressure responsive closure member.

13. A depth gauge for strapping on the wrist of a skin diver, which comprises:

a shallow, cup-shaped, substantially rigid housing which is open at the upper end thereof, a dial provided in generally parallel relationship to said open upper end of said housing, an indicator mounted within said housing and movable to different positions relative to said dial, at least part of said indicator being visible through said open upper end of said housing, a Bourdon tube mounted within said housing and operatively connected with said indicator, whereby the pressure sensed by said Bourdon tube will effect a corresponding positioning of said indicator relative to said dial, a substantially incompressible liquid substantially completely filling said housing and immersing said Bourdon tube and said indicator, a member disposed at the open upper end of said housing to confine said liquid therein, the periphery of said member being adjacent said open upper end of said housing, at least parts of said member being transparent whereby to permit the diver to look through said member and see said indicator, and resilient sealing and motion-permitting means provided between the periphery of said member and said open upper end of said housing, said last-named means effecting sealing of said member relative to said housing whereby to prevent either ingress of sea water into said housing or egress of said liquid from said housing, said last-named means permitting a small degree of movement of said member toward the bottom of said housing in response to a descent by the diver into the sea, said small degree of movement effecting an increase in the pressure of said liquid within said housing to thus cause said Bourdon tube to move said indicator relative to said dial.

14. A depth gauge for a skin diver comprising:

a rigid housing having a side wall and first and second ends, said housing defining a chamber that extends substantially throughout the entire housing, said housing having an opening therein extending substantially across one end of said chamber, a fixed end member sealed to said housing at the other end of said chamber, indicator means mounted within said chamber and movable to different positions to provide a visual display of pressure, a Bourdon tube mounted within said chamber and operatively connected with said indicator means, whereby pressure exerted upon said Bourdon tube will effect a corresponding display of said indicator means, a substantially incompressible liquid substantially completely filling said chamber and immersing said Bourdon tube and said indicator means, a pressure responsive closure member positioned in said opening for limited movement toward and away from said chamber, said closure member having its inner face in substantially full contact with said liquid, at least part of one of said members being transparent whereby to permit the diver to look through said one member and see said indicator means, means for mounting said closure member to said housing for said limited motion, and for resiliently securing and sealing said closure member to and within said opening to resiliently retain said closure member in position and to seal said liquid within said chamber, said mounting, securing and sealing means comprising a resilient element continuously interconnected to and between the periphery of said closure member and the surrounding portion of said chamber within said opening, said resilient element being secured throughout its extent in sealing relation to said closure member and to the opening of said chamber, whereby an increase in pressure exerted upon said closure member is transmitted to said liquid over substantially all of said closure member face by limited motion of said closure member toward said chamber, to thereby compress said Bourdon tube and move said indicator means to provide a display of pressure visible through said one transparent member part, and whereby said closure member is returned to an initial position when said increase in pressure is no longer exerted upon said closure member.

* * * * *